United States Patent [19]

Wimmer

[11] Patent Number: 4,697,765

[45] Date of Patent: Oct. 6, 1987

[54] PARACHUTE REEFING/RELEASE DEVICE

[75] Inventor: Martin A. Wimmer, Mesa, Ariz.

[73] Assignee: Motorola, Inc., Schaumburg, Ill.

[21] Appl. No.: 887,764

[22] Filed: Jul. 21, 1986

[51] Int. Cl.⁴ .......................................... B64D 17/38
[52] U.S. Cl. ................................ 244/152; 244/151 B
[58] Field of Search ........... 244/142, 147, 152, 151 A, 244/151 B, 150

[56] References Cited

U.S. PATENT DOCUMENTS

| 1,845,466 | 2/1932 | Williams | 244/151 B |
| 2,740,600 | 4/1956 | Kelly | 244/151 A |
| 3,153,395 | 10/1964 | Karp | 244/151 B |
| 3,758,055 | 9/1973 | Adams | 244/151 B |

FOREIGN PATENT DOCUMENTS

| 1323217 | 2/1963 | France | 244/151 B |
| 116934 | 3/1958 | U.S.S.R. | 244/151 B |

Primary Examiner—Galen Barefoot
Attorney, Agent, or Firm—Harry A. Wolin; Eugene A. Parsons

[57] ABSTRACT

A parachute reefing/release device wherein when an actuator is activated and the device is subjected to a predetermined force, a multi-sectioned reefer will separate from a cylindrical housing causing separation of the multi-sectioned reefer into its components causing either a release of a submunition from a parachute or a reefing function of the parachute to take place.

2 Claims, 7 Drawing Figures

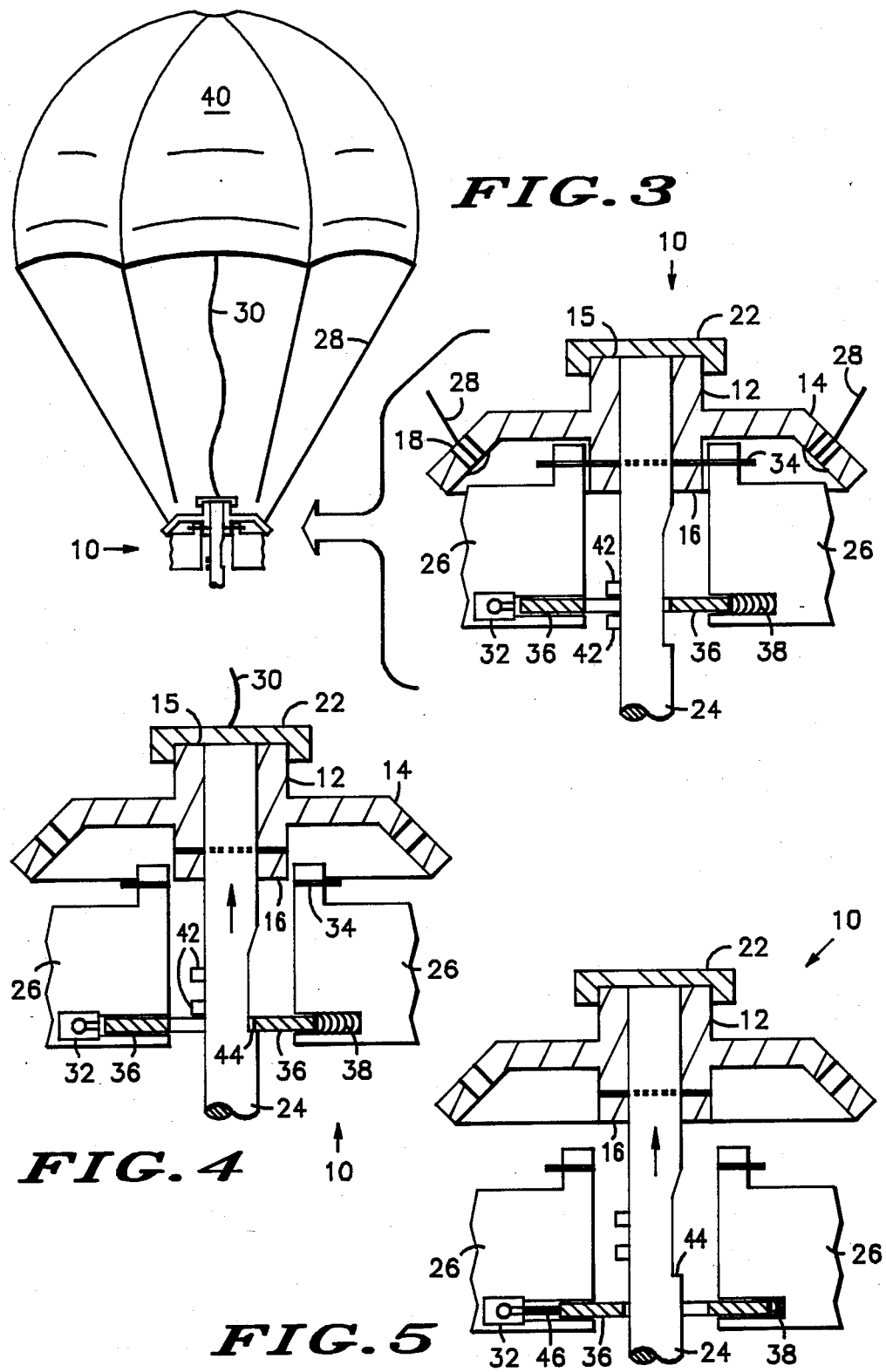

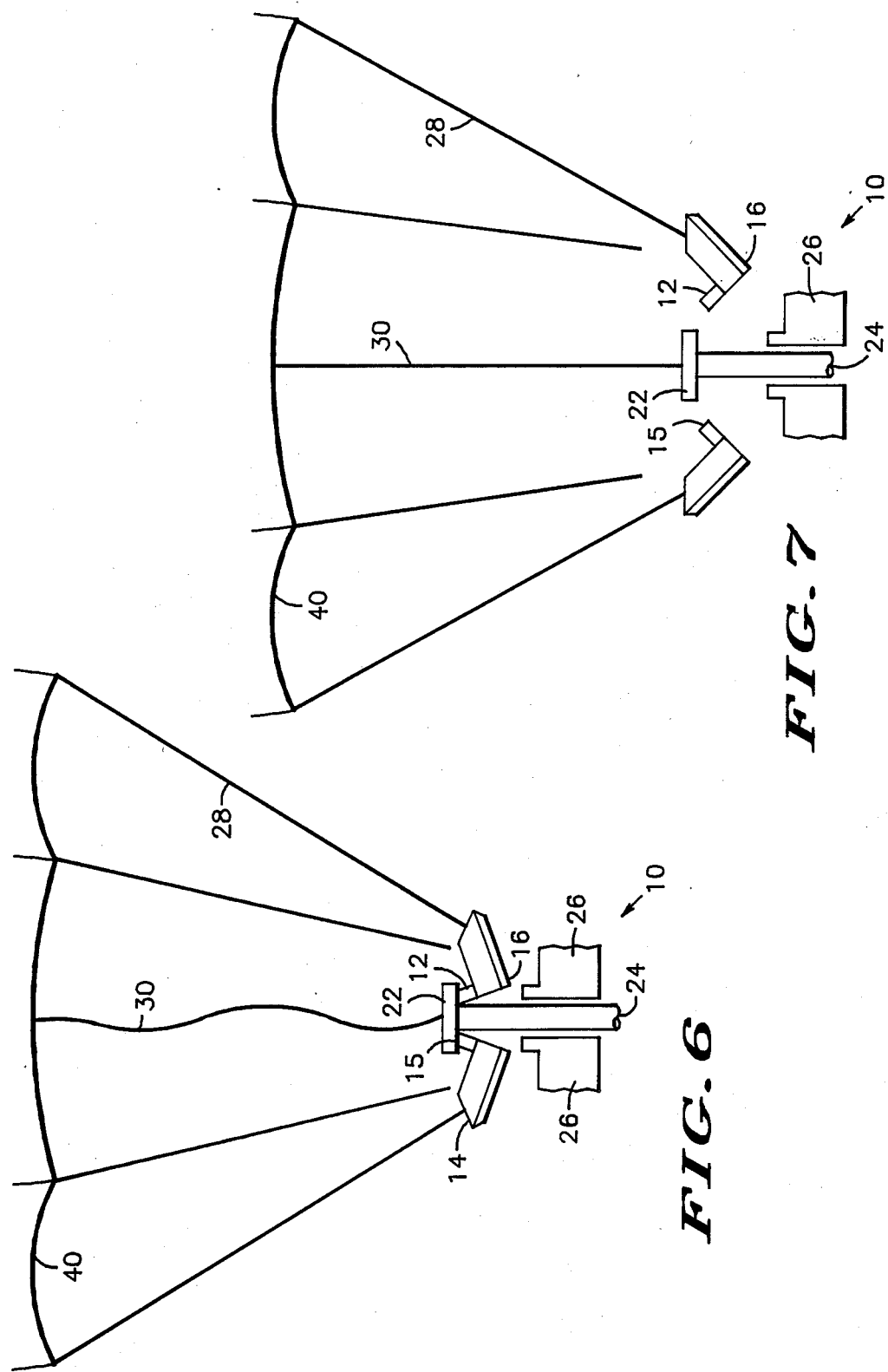

PARACHUTE REEFING/RELEASE DEVICE

BACKGROUND OF THE INVENTION

This invention generally pertains to a parachute reefing/release device. Generally, it is common to use parachutes as a submunition orientation and stabilization device for low altitude delivery of tactical munitions. The problem with using parachutes in this manner is their inability to effectively penetrate foliage. This greatly reduces weapon effectiveness. The addition of a parachute reefing/release device is a means of accomplishing greater submunition foliage penetration. This is so because a parachute reefing/release device reduces the effective parachute drag area. The release function completely rids a submunition of the parachute attachment while the reefing function allows the parachute to follow the submunition upon release by means of a line from the parachute to the submunition. Because there is less exposed parachute area, the chance of the submunition becoming entangled in the foliage is greatly reduced.

SUMMARY OF THE INVENTION

The present invention pertains to a parachute reefing/release device comprising a multi-sectioned reefer having an outer ring and a center column, said outer ring including a means of attachment for parachute lines. In an initial position, said center column is held in place by a collar on the top end and a cylindrical housing on the bottom end, said center column surrounds a shaft to which said collar is attached towards the top end, said collar may also be attached to an optional loose parachute reefing line if the reefing function is desired.

As the parachute is released, a predetermined load force is applied to the parachute reefing/release device. This force causes a shear wire to be broken allowing an initial displacement of said shaft. Next, an electro-explosive actuator is activated by a time controlled method causing displacement of a slotted plate. This allows said shaft a maximum displacement so that said bottom ends of said center columns are no longer retained in place by said cylindrical housing. Because said outer ring is still subjected to the parachute load force through said parachute lines, separation of said multi-sectioned reefer occurs. As separation continues, said top ends of said center column will become positioned so that they will separate from said collar.

It is an object of the present invention to provide an improved parachute reefing/release device which allows better foliage penetration for low altitude delivery of tactical munitions by parachute.

It is a further object of the present invention to provide a new and improved parachute reefing/release device which eliminates the use of a separate device generally needed to carry out the reefing/release function when a one piece reefer is used.

It is a further object of the present invention to provide a new and improved parachute reefing/release device which reduces costs and simplifies the safe and arm design by using the parachute load force to begin the reefing/release function.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 3 is a cross-sectional view of a parachute reefing/release device embodying the present invention;

FIG. 4 is a cross-sectional view similar to that of FIG. 3 wherein the multi-sectioned reefer has begun to clear the cylindrical housing;

FIG. 5 is a cross-sectional view similar to that of FIG. 3 wherein the multi-sectional reefer has completely cleared the cylindrical housing;

FIG. 6 is a cross-sectional view similar to that of FIG. 3 wherein the multi-sectioned reefer has begun to separate into its sections which are still retained by a collar; and FIG. 7 is a cross-sectional view similar to FIG. 3 wherein the sections of the multi-sectioned reefer have completely separated and are no longer retained by the collar.

DESCRIPTION OF THE PREFERRED EMBODIMENTS

Figure 1:
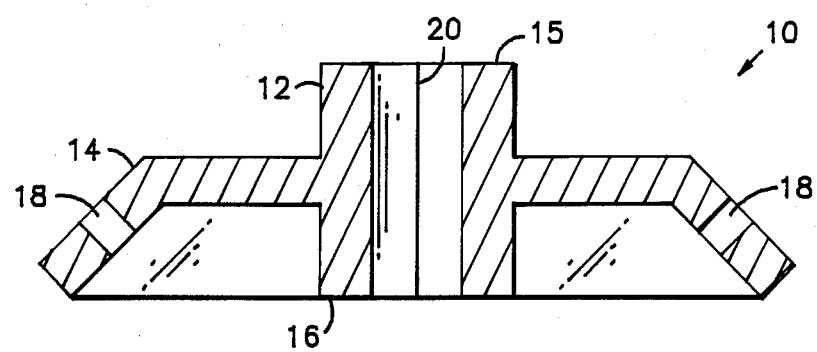
FIG. 1 is a cross-sectional view of a multi-sectioned reefer.
Figure 2:
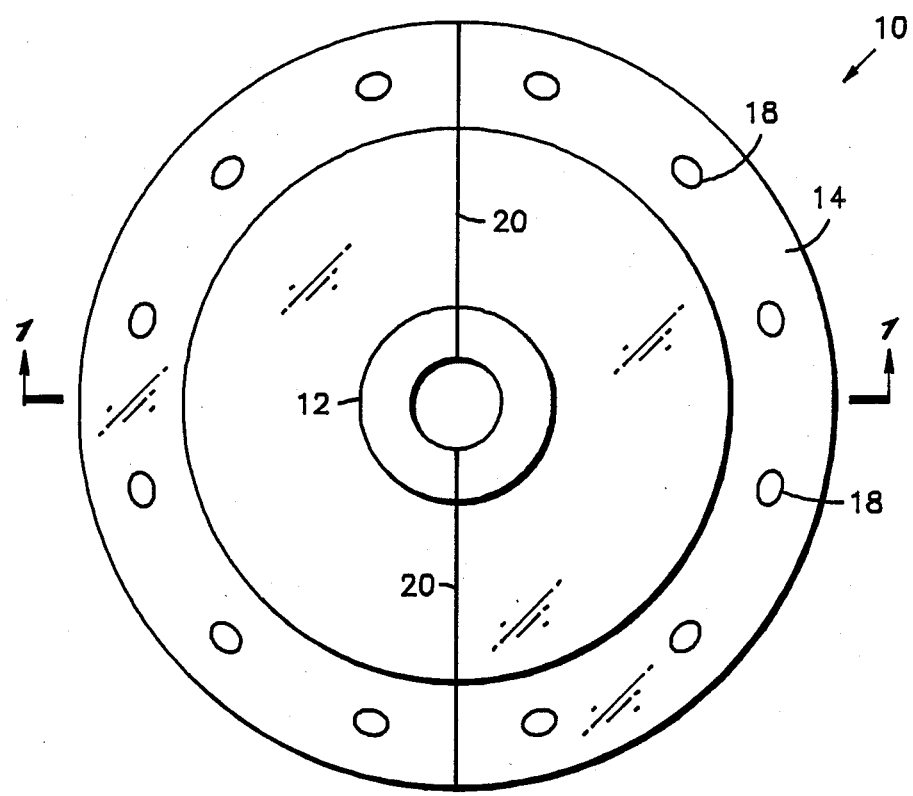
FIG. 2 is a top view of the multi-sectioned reefer illustrated in FIG. 1.

Referring specifically to FIG. 1, a multi-sectioned reefer, designated 10 is illustrated in cross-section. The preferred embodiment has two sections which are shown by parting line 20. The sections of multi-sectioned reefer 10 form a hollow cylindrical center column 12. These sections have top ends 15 and bottom ends 16. The multi-sectioned reefer 10 also has an outer ring 14, affixed coaxially to column 12, which contains appertures 18 for parachute line attachment. FIG. 2 is a top view of the multi-sectioned reefer 10.

Referring specifically to FIG. 3, a cross-sectional view of a parachute reefing/release device embodying the present invention is shown. FIG. 3 shows the parachute reefing/release device in its initial position. In its initial position, reefer 10 is retained in place by a cup shaped collar 22 positioned coaxially over top ends 15 of center column 12. Reefer 10 is further kept in place at bottom ends 16 of center column 12 by a cylindrical housing 26 positioned coaxially around column 12. Collar 22 is attached to the top end of a shaft 24. Shaft 24 extends coaxially through center column 12 of reefer 10.

Outer ring 14 of reefer 10 contains appertures 18 for parachute line attachment. This embodiment is shown with a plurality of parachute lines 28 attached to appertures 18 at one end and to a parachute 40 at the other end. A loose parachute reefing line 30 is attached at its lower end to collar 22 and is attached at its upper end to parachute 40. Loose parachute reefing line 30 is optional for use when reefing action rather than a strict release action is desired.

The parachute reefing/release device includes a means for activation which serves to initiate the desired reefing/release functions of the device. An electro-explosive actuator 32 is fixed to housing 26. A slotted plate, 36, is positioned planar to actuator 32 and is held in its initial position by a spring, 38. The parachute reefing/release device has two safety features which do not allow the reefing/release function unless it is desired. A shear wire, 34, is positioned through shaft 24 and center column 12 of reefer 10 and is held stationary in cylindrical housing 26. A predetermined force must be applied to the parachute reefing/release device in order to break shear wire 34 allowing shaft 24 and reefer 10 to move. In addition, two stops, 42, extend radially outward from shaft 24 to which they are fixed. If actuator 32 fires without the predetermined force subjected to the parachute reefing/release device, actuator 32 will displace plate 36 compressing spring 38 and plate 36 will lock in between stops 42 holding shaft 24 stationary.

The parachute reefing/release device initiates performance when a predetermined force is applied to it, usually the parachute load force. Referring specifically to FIG. 4, the parachute load force is applied to the parachute reefing/release device causing shear wire 34 to break which allows a displacement of shaft 24 relative to cylindrical housing 26. At this point, actuator 32 has not yet been activated so that plate 36 has not compressed spring 38. Therefore, plate 36 stops shaft 24 from further displacement when it engages a shoulder, 44, extending radially outward from shaft 24. Stops 42 have been displaced with shaft 24 so that they may no longer hold shaft 24 stationary upon firing of actuator 32 if the parachute load force has been applied. Bottom ends 16 of center column 12 have not yet cleared cylindrical housing 26 and are not in a position to begin separation from shaft 24.

Referring specifically to FIG. 5, actuator 32 is activated by a time controlled method and actuator extension 46 displaces plate 36 causing spring 38 to be compressed. The displacement of plate 36 allows shoulder 44 to disengage plate 36 and shaft 24 moves until bottom ends 16 of center column 12 have completely cleared cylindrical housing 26 and are no longer surrounded by it.

Referring specifically to FIG. 6, reefer 10 is shown where bottom ends 16 of center column 12 have begun to separate from shaft 24 after bottom ends 16 of center column 12 have cleared housing 26. The top ends 15 of center column 12 are still retained around shaft 24 by collar 22. The parachute reefing/release device is still subject to forces exerted by parachute lines 28 to outer ring 14.

Referring specifically to FIG. 7, reefer 10 has completely separated into its components. Both bottom ends 16 and top ends 15 of center column 12 are no longer held in place by either housing 26 or collar 22, respectively. The parachute reefing/release device minus the components of reefer 10 is now released from parachute 40 unless the reefing action is required wherein loose parachute reefing line 30 is connected at one end to collar 22 and at the other end to parachute 40 causing parachute 40 to have a decreased drag area so that it may better penetrate foliage and follow the munition to the ground.

This description has shown a new and improved parachute reefing/release device which reduces costs and simplifies a safe and arm design by using the parachute load force to begin the reefing/release function. Further, the device allows for better foliage penetration for low altitude delivery of munitions by parachute and eliminates the need for a separate device generally needed to carry-out the reefing/release function with the use of a one piece reefer. Thus, while we have shown and described specific embodiments of this inventon, further modification and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. A parachute reefing/release device comprising:
   a reefer having a plurality of severable sections;
   releasable means for holding said sections of said reefer together until such time as reefing/release action is desired, said releasable means having a safe position, an actuated position, and release of said reefer;
   force actuating means connected to said releasable means and said reefer for holding said releasable means in the safe position and allowing said releasable means to move to the actuated position upon the application of a predetermined force to said reefer; and
   means mounted adjacent said releasable means for initiating release of said releasable means when said releasable means is in the actuated position and a signal is supplied thereto.

2. A parachute reefing/release device comprising:
   a reefer having a plurality of severable sections;
   a cup shaped collar and stationary cylindrical housing mounted adjacent said reefer and holding said sections of said reefer in place;
   an axially upwardly movable shaft initially held stationary by a breakable shear wire positioned through said shaft and anchored in said cylindrical housing;
   an electro-explosive actuator fixed to said cylindrical housing;
   a slotted plate held stationary by a spring until said electro-explosive actuator is activated causing compression of said spring; and
   a shoulder extending radially outwardly from said shaft to engage said slotted plate prior to activation of said activator.

* * * * *